3,380,988
DIAZONIUM SALTS AND PROCESS FOR
THEIR PREPARATION
Jean Rigaudy, Bourg-la-Reine, France, assignor to Roussel-UCLAF, Paris, France, a corporation of France
No Drawing. Filed Oct. 14, 1964, Ser. No. 403,922
Claims priority, application France, Oct. 15, 1963, 950,648
17 Claims. (Cl. 260—142)

ABSTRACT OF THE DISCLOSURE

A process for the preparation of diazonium salts of primary amines comprising oxidizing a primary amine or an acid salt thereof in an anhydrous organic solvent reacting the oxidation product with nitric oxide in the absence of oxygen and then reacting the latter product with a Lewis acid to form the corresponding diazonium salt.

---

The usual diazotization processes employ reagents capable of generating a nitroso ion (NO⊕) or equivalents of the said ion. However, certain amines partly or completely resist diazotization with these conventional reagents, particularly in the case of amines which undergo other reactions such as oxidation of the amino group during reaction with nitrous acid. Example of such amines are p,p'-diamino diphenylene methane sulfonate (3,6-diamino-10-dioxy-thioxanthene), 9-amino-anthracene and 3-diamino-4-dihydroxy-arsenobenzene (arsphenamine).

It is an object of the invention to provide a novel process for the diazotization of amines in high yields and without competing side reactions.

It is a further object of the invention to provide a novel process for the diazotization of amine with nitric oxide.

It is an additional novel object of the invention to provide a novel process for the diazotization of amines in a medium wherein the diazonium salt is insoluble and recovery thereof is facilitated.

It is another object of the invention to provide novel diazonium salts of amines which have not previously been possible to make and to provide novel dyestuffs derived therefrom.

These and other objects and advantages of the invention will become obvious from the following detailed description.

The novel process of the invention for the preparation of diazonium salts of primary amines comprises oxidizing a compound selected from the group consisting of a primary amine and an acid salt of a primary amine in an anhydrous organic solvent and reacting the oxidation product with nitric oxide in the absence of oxygen to form the corresponding nitrosamine which in the presence of a Lewis acid forms the corresponding diazonium salt of the primary amine.

Depending upon the primary amine, the oxidation may be effected with nitric oxide in the absence of oxygen. With certain amines such as 2,4,6-triphenylaniline, the nitric oxide in the absence of oxygen will react with the amine dissolved in the organic solvent to form the corresponding diazonium hyponitrite which instantly precipitates and the latter upon reaction with a Lewis acid will form the corresponding diazonium salt. With other amines such as 3-amino-pyrene, the reducing effect of the hyponitrous acid formed in situ reduces the yield of the diazonium salt and therefore, the amine salt in suspension in an anhydrous organic solvent is used as the starting material since the nitric oxide reaction do directly form the corresponding diazonium salt in high yields.

With a great number of amines such as 9-amino-anthracene, the nitric oxide is not a strong enough oxidizing agent and a stronger oxidizing agent must be used with the nitric oxide. The action of the oxidizing agent on an organic solution of the amine, saturated with nitric oxide in the absence of oxygen, causes the formation of the nitrosamine which when reacted with a Lewis acid is converted into the corresponding diazonium salt of the primary amine. The reaction scheme is illustrated in the following table.

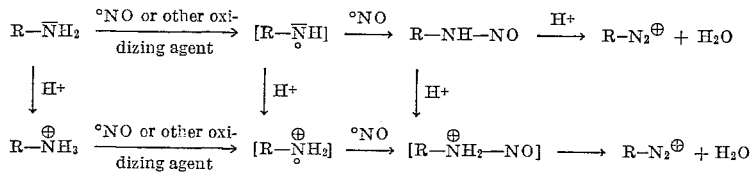

wherein R is the organic moiety of the primary amine.

The reaction with nitric oxide is preferably effected at room temperature although temperatures of 0 to 30° C. may be used and the reaction is usually complete within an hour. The organic solvents are preferably aliphatic ethers such as ethyl ether or benzene hydrocarbons such as benzene or toluene but other inert organic solvents may be used.

Examples of suitable stronger oxidizing agents are metal oxides such as lead dioxide, manganese dioxide, mercuric oxide, silver oxide or vanadium pentoxide, or potassium ferricyanide, or the gaseous nitrous products produced in situ by adding a moderate amount of oxygen to the solution to oxide a portion of the nitric oxide.

The Lewis acids used to convert the nitrosamine to the corresponding diazonium salt are well known in the art and any of the usual acids used to form diazonium salts may be used. Examples of suitable Lewis acids are hydrochloric acid, sulfuric acid, fluoboric acid, etc. Also, a Lewis acid in the presence of a salt such as zinc chloride in acetone containing hydrochloric acid may be used to form a double diazonium salt.

Examples of suitable primary amines useful as starting materials are any known primary amine which undergoes normal diazotization such as aniline, o-, m- and p-phenylene diamine, o- and p-aminophenols, 3-aminopyrene, etc., as well as primary amines which have not previously been capable of diazotization such as 9-amino anthracene, etc.

The diazonium salts produced by the process of the invention are useful in the dye industry as intermediates for the preparation of azo dyes and other derivatives.

In the following examples there are described several preferred embodiments to illustrate the invention. However, it should be understood that the invention is not intended to be limited to the specific embodiments.

EXAMPLE I

Preparation of the diazonium fluoborate of 2,4,6-triphenylaniline

A stream of nitric oxide was bubbled through a a solution of 2,4,6-triphenyl aniline in ether for 15 minutes in the absence of atmospheric oxygen and almost immediately a yellow diazonium salt of 2,4,6-triphenyl aniline precipitated. A stream of nitrogen was passed through the solution to remove excess nitric oxide and then a solution of 40% fluoboric acid was added to the solution and the mixture was agitated at room temperature for half an hour to obtain a 93% yield of the yellow-colored diazonium fluoborate of 2,4,6-triphenylaniline having an instantaneous melting point of 185° C. (with decomposition). The product was purified by dissolution in acetonitrile and precipitated with anhydrous ether which gave a total yield, after drying, of 89% of the product having an instantaneous melting point of 186–187° C. (with decomposition).

Diazonium salts of 2,4,6-triphenylaniline are not described in the literature.

Coupling of diazonium fluoborate of 2,4,6-triphenyl-aniline with β-naphthol

An equilmolar amount of a solution of sodium β-naphtholate in ethanol was added to an ethanolic solution of the diazonium fluoborate of 2,4,6-triphenylaniline under agitation while maintaining the temperature at about 0° C. After two hours of agitation, the red azo precipitate which had formed was filtered off and washed with a dilute solution of sodium hydroxide and then with ethanol to obtain 87% of β-naphtholazo-2,4,6-triphenylbenzene having a melting point of 235° C. Upon purification by recrystallization from ethanol, a 70% total yield of the product having a melting point of 236° C. was obtained.

EXAMPLE II

Preparation of diazonium chloride of 3-amino-pyrene

Dry gaseous hydrochloric acid was bubbled through a solution of 100 mg. of 3-amino-pyrene in 50 cc. of anhydrous ether to obtain a colorless precipitate of 3-amino-pyrene hydrochloride in suspension in a mother liquor having a slight blue-green fluoresence. After cooling, the said ethereal suspension was placed in a bubble apparatus previously flushed successively with nitrogen and nitric oxide and nitric oxide was bubbled through the suspension for forty-five minutes during which the precipitate turned orange-yellow while the liquor became colorless. Excess nitric oxide was removed by bubbling a stream of nitrogen through the suspension for several minutes and the precipitate formed was separated by centrifuging, washed with anhydrous ether and dried to obtain a 94% yield of the orange-yellow pyrene-3-diazonium chloride having an instantaneous melting point of 150 to 152° C. (with decomposition).

Coupling of pyrene-3-diazonium chloride and β-naphthol

A solution of 50 mg. of pyrene-3-diazonium chloride prepared above in about 10 cc. of water was added to a solution of 27 mg. of β-naphthol in 3 cc. of 0.1 N sodium hydroxide while maintaining the temperature at about 0° C. After several hours of agitation, the fine dark violet precipitate which had formed was separated, washed with ethanol and recrystallized from benzene to obtain 27 mg. of β-naphthol-3-azo-pyrene having a melting point of 256° C. The product was identical to the product prepared by Lund et al. (Det. Kgl. Danske Videnskabernes Selskab Mat. fys. Meddelser, vol. 22, No. 15, 1946, pp. 1 to 16).

EXAMPLE III

Preparation of diazonium salts of 9-amino-anthracene

A round bottom flask equipped with a dropping funnel and a magnetic stirrer was flushed first with nitrogen and then with nitric oxide. Then, while maintaining the flow of nitric oxide and under diffused light, a solution of 500 mg. of 9-amino-anthracene was introduced into 100 cc. of anhydrous ether previously cooled to 0° C. Nitric oxide was bubbled through this solution for a period of 20 minutes and then a suspension of 1.5 gm. of lead dioxide in ether was introduced through the dropping funnel with agitation to aid contact between the oxidizing agent and the organic solution. After the green fluorescence of the amine under Wood's light had completely disappeared which indicated the end of the reaction, the flow of nitric oxide was continued for 10 minutes longer. Then, the reaction mixture in the flask was flushed with nitrogen to remove nitric oxide and then rapidly filtered to remove the lead dioxide. The resulting non-fluorescent, orange-red solution was used to prepare the following diazonium salts of 9-amino-anthracene.

(A) Gaseous hydrochloric acid was bubbled through the orange-red solution and a yellow orange powder precipitate of anthracene-9-diazonium chloride was immediately formed.

(B) An ether solution of 8% sulfuric acid was added to the orange-red solution under agitation and a yellow-orange powder of anthracene-9-diazonium sulfate was immediately formed.

(C) A 34% solution of fluoboric acid was added to the orange-red solution and a 65% yield of orange powder precipitate of anthracene-9-diazonium fluoborate having an instantaneous melting point of 205–210° C. (with decomposition) was obtained.

(D) A chloride of zinc solution in acetone containing 2% hydrochloric acid was added to the orange-red solution to form a double diazonium salt of 9-amino-anthracene with zinc chloride.

9-amino-anthracene was prepared according to the process described by Meisenheimer et al. (Ann. Chem., 1904, vol. 330, p. 165). To prevent auto-oxidation, it should be kept under vacuum and in darkness. The nitric oxide was prepared according to the process described by Noyes (J.A.C.S., vol. 47, 1925, p. 2170). The nitric oxide was carefully separated from $NO_2$ by bubbling it through concentrated sulfuric acid.

The diazonium salts of 9-amino-anthracene, which are not described in the literature, are soluble in water and are useful for the preparation of dyes by coupling with phenols and amines.

Coupling of anthracene-9-diazonium fluoborate with β-naphthol

An equimolar aqueous solution of sodium β-naphtholate was added to an aqueous solution of anthracene-9-diazonium fluoborate maintained at a temperature of about 0° C. and the reaction mixture was agitated for 45 minutes at a temperature of about 0 to 5° C. The solution was left for two hours at room temperature and β-naphthol 9-azo-anthracene was extracted therefrom with an ether-benzene mixture. The organic extract was washed with a dilute solution of sodium hydroxide and the water was concentrated to dryness to obtain a 60% yield of the dyestuff. Upon purification by recrystallization from benzene, a 36% total yield of violet crystals of β-naphthol 9-azo-anthracene having an instantaneous melting point of 230–231° C. was obtained.

Various modifications of the process of the invention may be made without departing from the spirit or scope thereof and it is to be understood that the invention is intended to be limited only as defined in the appended claims.

I claim:

1. The diazonium salts selected from the group consisting of fluoroborate, halide, sulfate and zinc chloride of 2,4,6-triphenyl aniline.

2. The diazonium fluoborate of 2,4,6-triphenyl aniline.

3. The diazonium salts selected from the group consisting of fluoroborate, halide, sulfate and zinc chloride of 9-amino-anthracene.

4. Diazonium chloride of 9-amino-anthracene.

5. Diazonium sulfate of 9-amino-anthracene.

6. Diazonium fluoborate of 9-amino-anthracene.

7. Double diazonium salt of 9-amino-anthracene and zinc chloride.

8. A process for the preparation of diazonium salts selected from the group consisting of fluoroborate, halide, sulfate and zinc chloride of aromatic primary amines which comprises oxidizing an aromatic primary amine in an inert anhydrous organic solvent with an oxidizing agent selected from the group consisting of metal oxides, potassium ferricyanide and gaseous nitrous products formed in situ by oxidation of nitric oxide, reacting the oxidation product with nitric oxide in the absence of oxygen and then reacting the resulting product with a Lewis acid selected from the group consisting of hydrochloric acid, sulfuric acid, fluoroboric acid and hydrochloric acid in the presence of a zinc salt to form the corresponding diazonium salt of the aromatic primary amine.

9. The process of claim 8 wherein the organic solvent is selected from the group consisting of ethers and benzene hydrocarbons.

10. The process of claim 8 wherein the oxidizing agent is lead dioxide.

11. The process of claim 8 wherein the oxidizing agents are gaseous nitrous products formed in situ by the partial oxidation of nitric oxide with oxygen.

12. A process for the preparation of diazonium salts selected from the group consisting of fluoroborate halide, sulfate and zinc chloride of primary amines which comprises reacting a primary aromatic amine with nitric oxide in an anhydrous inert organic solvent to form the diazonium hyponitrite of the primary aromatic amine and reacting the latter with a Lewis acid selected from the group consisting of hydrochloric acid, sulfuric acid, fluoroboric acid and hydrochloric acid in the presence of a zinc salt to form the corresponding diazonium salt of the primary aromatic amine.

13. A process for the preparation of diazonium salts selected from the group consisting of fluoroborate, halide, sulfate and zinc chloride of primary aromatic amines which comprises reacting an acid salt selected from the group consisting of fluoroborate, halide, sulfate and zinc chloride of a primary aromatic amine with nitric oxide in an anhydrous inert organic solvent to form the corresponding diazonium salt of the primary aromatic amine.

14. A process for the preparation of diazonium salts selected from the group consisting of fluoroborate, halide, sulfate and zinc chloride of primary aromatic amines which comprises reacting a primary amine with an oxidizing agent selected from the group consisting of metal oxides, potassium ferricyanide and gaseous nitrous products formed in situ by oxidation of nitric oxide and nitric oxide in an anhydrous inert organic solvent to form the corresponding nitrosamine and reacting the latter with a Lewis acid selected from the group consisting of hydrochloric acid, sulfuric acid, fluoroboric acid and hydrochloric acid in the presence of a zinc salt to form the corresponding diazonium salt of the primary aromatic amine.

15. A process for the preparation of diazonium salts selected from the group consisting of fluoroborate, halide, sulfate and zinc chloride of 2,4,6-triphenylaniline which comprises reacting 2,4,6-triphenylaniline with nitric oxide in anhydrous ether to form 2,4,6-triphenylaniline diazonium hyponitrite and reacting the latter with a Lewis acid selected from the group consisting of hydrochloric acid, sulfuric acid, fluoroboric acid and hydrochloric acid in the presence of a zinc salt to form the corresponding diazonium salt of 2,4,6-triphenyl aniline.

16. A process for the preparation of diazonium salts selected from the group consisting of fluoroborate, halide, sulfate and zinc chloride of 3-amino-pyrene which comprises reacting an acid salt selected from the group consisting of fluoroborate, halide, sulfate and zinc chloride of 3-amino-pyrene with nitric oxide in anhydrous ether to form the corresponding diazonium salt of 3-amino-pyrene.

17. A process for the preparation of diazonium salts selected from the group consisting of fluoroborate, halide, sulfate and zinc chloride of 9-amino-anthracene with lead dioxide and nitric oxide in anhydrous ether to form 9-nitrosamine-anthracene and reacting the latter with a Lewis acid selected from the group consisting of hydrochloric acid, sulfuric acid, fluoroboric acid and hydrochloric acid in the presence of a zinc salt to form the corresponding diazonium salt of 9-amino-anthracene.

No references cited.

CHARLES B. PARKER, *Primary Examiner.*

D. M. PAPUGA, *Assistant Examiner.*